United States Statutory Invention Registration [19]

[11] Reg. Number: H219

Sayles [43] Published: Feb. 3, 1987

[54] LAYERED CONSTRUCTION OF COMPOSITE INTERCEPTOR MOTOR CASES, ETC.

[75] Inventor: David C. Sayles, Huntsville, Ala.

[73] Assignee: The United States of America as represented by the Secretary of the Army, Washington, D.C.

[21] Appl. No.: 577,636

[22] Filed: Feb. 6, 1984

[51] Int. Cl.[4] ..... B65H 81/00; C06B 45/12

[52] U.S. Cl. ..... 156/169; 102/287; 102/347; 60/200.1

[58] Field of Search ..... 156/169, 172, 173, 175, 156/166; 264/137, 258; 60/200.1, 255; 220/1 B, DIG. 23, 414; 428/35, 36; 102/347, 287

[56] References Cited

U.S. PATENT DOCUMENTS 3,602,067 8/1971 Wetherbee, Jr. ..... 74/572

*Primary Examiner*—John F. Terapane
*Assistant Examiner*—Eric Jorgensen
*Attorney, Agent, or Firm*—John C. Garvin, Jr.; Freddie M. Bush; Anthony T. Lane

[57] ABSTRACT

Improved method of manufacturing composite rocket motor cases and laminated structures is disclosed which includes a layered procedure wherein a high percentage of a highly flexibilized, low-modulus epoxy blend of a resin composition is employed in the matrix of the innermost layer section with a subsequent, gradual addition of a toughened (or hard) high-modulus resin to the filament impregnating bath during the filament winding process to achieve a higher-modulus resin composition in the intervening layers with the highest modulus resin composition being in the outermost layer section to achieve a gradation in mechanical properties to mechanical behavior.

The resin composition employed to impregnate a fiber material as the fiber material is passed through a filament impregnating bath is comprised of a four component composition wherein a first component is selected from diglycidyl ether of bisphenol A and a thermoplastic phenol-formaldehyde resin in parts by weight from about 25 to about 95, a second component is epoxidized dimer of oleic acid in parts by weight from about 75 to about 5, a third component is a reactive plasticizer of butanediol diglycidyl ether in parts by weight of about 25, and a fourth component is an amine crosslinking agent or curative in parts by weight of about 20. The fourth component consists of a mixture of 65 weight percent 4,4′-diaminodiphenylmethane, 10 weight percent of triamines, and 25 weight percent of polyamines.

3 Claims, 14 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LAYERED CONSTRUCTION OF COMPOSITE INTERCEPTOR MOTOR CASES, ETC.

DEDICATORY CLAUSE

The invention described herein may be manufactured, used, and licensed by or for the Government for governmental purposes without the payment to me of any royalties thereon.

BACKGROUND OF THE INVENTION

Composite rocket motor cases and laminated structures which are laminates of a fiber material and a curable resin composition have been widely used in the solid propulsion industry. The development and use of nonmetallic rocket and missile motor cases and laminated structures have resulted in considerable weight reduction for these types of structures as compared with earlier materials employing high strength steel, such as heat treated 4130 steel. By reducing the motor case weight and the total weight of a rocket motor more propulsion energy per unit weight is available for delivering a rocket payload for a greater distance and at an increased velocity. With a steady improvement in high energy propellants more and more requirements have been placed on rocket motor cases and laminated structures. Therefore, a method of manufacturing composite rocket motor cases and laminated structures to yield structures having markedly superior characteristics would be well received in the solid propulsion industry to keep pace with the needs of systems employing high energy propellants such as required for advanced interceptor rocket motors.

Thus, an object of this invention is to provide a method of manufacturing composite rocket motor cases and laminated structures which have markedly superior characteristics.

A further object of this invention is to provide a method of manufacturing composite rocket motor cases and laminated structures which have markedly superior characteristics that are derived from a fabrication technique employing a layered procedure for manufacture.

Still a further object of this invention is to provide a method of fabrication wherein the superiorities of composite rocket motor cases and laminated structures are derived by a progressive addition of a tougher epoxy resin to the filament impregnating bath during the filament winding process.

Additionally, a further object of this invention is to provide composite rocket motor cases and laminated structures wherein the method of fabrication employs a resin composition composed of a high percentage of a highly-flexibilized, low-modulus resin blend for the innermost layers with a progressive increase in the toughened or hardened resin content as the filaments are wound from the innermost layers through the intervening layers to the outermost layers which are comprised of the highest-modulus resin composition.

SUMMARY OF THE INVENTION

The method of this invention disclosure pertains to a method of manufacturing composite rocket motor cases and laminated structures which have markedly superior characteristics. This superiority derives from the fact that these composite rocket motor cases and laminates structures are fabricated using a layered procedure for manufacture. This is accomplished by the progressive addition of a tougher epoxy resin to the filament impregnating bath during the winding process. By using this procedure, the inner layers of the composite interceptor motor case, as an illustration, are wound when the resin composition is composed of a high percentage of a highly flexibilized, low-modulus epoxy blend and the outermost layers are wound when the resin blend has been modified through the gradual addition of a toughened (or hard) high-modulus epoxy resin to yield a less flexible, higher-modulus resin. The intervening layers are composed of progessively higher modulus resin composition.

The low-modulus epoxy blend composition employed for the innermost layer in accordance with the method of this invention is comprised in parts by weight, of:

- a first component of diglycidyl ether of bisphenol A (EPON 828)—25,
- a second component of epoxidized dimer acid (EPON 871)—75,
- a third component which is a reactive plasticizer of butanediol diglycidyl ether—25,
- and a fourth component TONOX 60/40—20.

TONOX 60/40 is an amine-crosslinking agent or curative which is a mixture of 4,4'-diaminodiphenylmethane 65% by weight, triamines 10% by weight, and polyamines 25% by weight.

The progressively higher resin composition which increases in the first component content to about 95 parts by weight and decreases in the flexibilized epoxy resin second component to about 5 parts by weight for the outermost layer, with intermediate layers in between of about 50 to about 75 parts by weight of the first component to about 50 and about 25 parts by weight of the second component respectfully.

The change in the epoxy blend in the filament impregnating process is accomplished by the progressive addition of EPON 828 (first component) and a corresponding decrease in the addition of EPON 871 (second component) to yield an outermost layer which is harder and more resistant to impact or abrasive damage. The innermost layer and layers in between have a greater load carrying capacity due to the shear loads being distributed over a larger area such as, for example, when the motor case undergoes pressurization.

DESCRIPTION OF THE PREFERRED EMBODIMENT

Figure 1A:
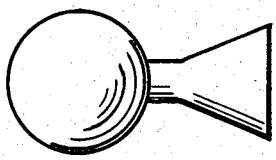
FIGS. 1A-1F of the drawing illustrates various types of rocket motor cases and related laminated structures which are fabricated by filament winding in combination with the method of this invention.
Figure 1B:
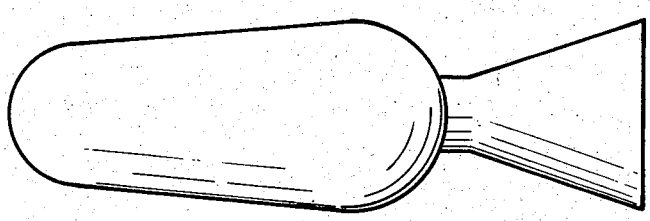
Figure 1E:
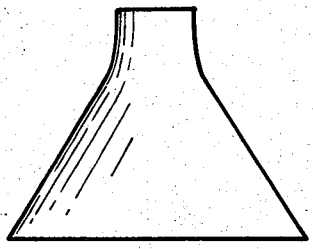
Figure 1C:
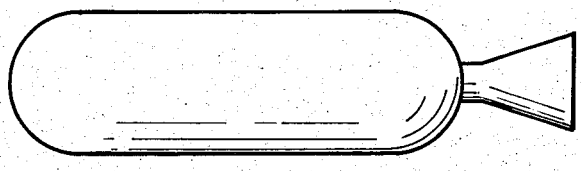
Figure 1F:
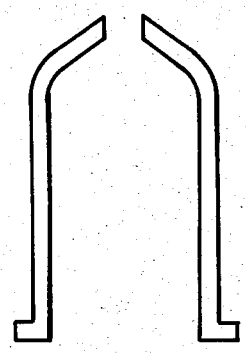
Figure 1D:
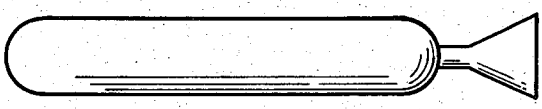
Figure 2A:
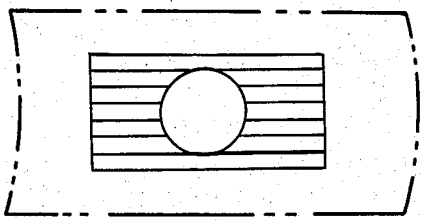
FIGS. 2A-2E of the drawing illustrates layered method of manufacture which has application to the fabrication of special regional reinforcements of structures manufactures in combination with the method of this invention.
Figure 2C:
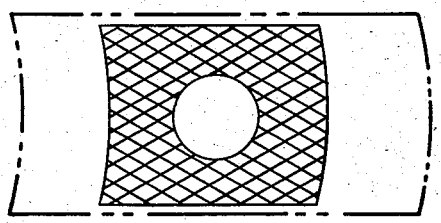
Figure 2B:
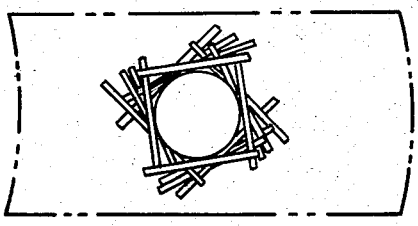
Figure 2D:
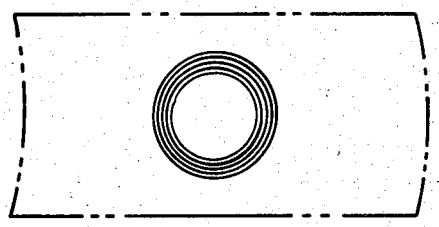
Figure 2E:
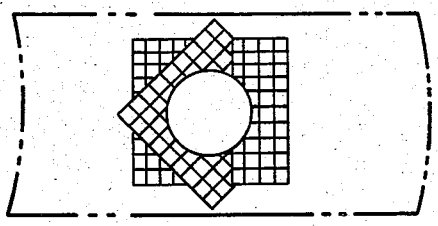

The method of manufacturing composite rocket motor cases and laminated structures in accordance with this invention includes a progressive addition of a tougher epoxy resin to the filament impregnating bath during the winding process to yield an inner layer of a low modulus value with a gradual transition to a higher modulus value and hardness value in the outermost layer as a result of the progressive addition of the tougher resin with a corresponding decrease in the flexibilized epoxy content. The intervening layers are composed of a progressively high resin composition and a corresponding lower content of the flexibilized resin. The tougher epoxy resin is diglycidyl ether of bisphenol A (EPON 828). The flexibilized epoxy resin is epoxidized dimer of oleic acid (EPON 871).

The layered method of laminate manufacture of this invention is applicable to: space and upper stage motors A, interceptor motor cases B, ballistic motor cases C, tactical motor cases D, exit cones E, igniter cases F, etc., as depicted in FIGS. 1A-1F.

The layered method of manufacture, also, has application to the fabrication of special regional reinforcements, such as "A", longitudinally-oriented longitudinal tapes, "B", tangentially-oriented longitudinal tapes, "C", partial helical layer laminates, "D", spiral-wound wafers, "E", bidirectional cloths, etc., which are depicted in FIGS. 2A-2E.

The principal design drivers for composite motor case and the exit cones for application to interceptor, tactical, ballistic, and space are enumerated in Table I. The fiber tensile strength, compressive strength, shear strength, stiffness and environment resistance are regarded as being of primary importance in the design of the extremely high performance requirements.

TABLE I

Principal Design Drivers For Composite Cases and Exit Cones

| Driver | Interceptor | Tactical | Ballistic | Space | Exit Cones |
|---|---|---|---|---|---|
| Fiber Tensile Strength | 1 | 2 | 1 | 1 | 2 |
| Compressive Strength | 1 | 1 | 2 | 2 | 1 |
| Shear Strength | 1 | 1 | 2 | 2 | 1 |
| Stiffness | 1 | 1 | 2 | 2 | 1 |
| Severe Environment | 1 | 1 | 2 | 2 | 2 |

NOTE:
1 = Primary
2 = Secondary

Thus, the considerations of the design drivers for composite cases and exit cones provided bases preceding the full conceptual efforts leading to this method wherein the fabrication achieves a desired result as confirmed by test data set fourth hereinbelow.

Fabricating motor cases, or laminates, in accordance with the method of this invention results in a gradation in mechanical properties and to mechanical behavior. Rocket motor cases and laminated structures should achieve the following improvements in characteristics:

1. higher burst strength,
2. increased resistance to mechanical failure,
3. increased tolerance towards mechanical damage,
4. greater dimensional stability,
5. improved hydrothermal resistance,
6. higher fiber efficiencies in the inner layers due to the lower shear forces which exist under tensile loading.

Although all of the improvements cited above have not been measured and fully evaluated, the significant changes in modulus and strain values to fibers (which will be illustrated following additional technical disclosures hereinbelow) do support the efficiency of the method of this invention.

The resins, EPON 828 and EPON 871, identified by name and structure below in Table II are employed in this invention as the tough epoxy resin and flexibilized epoxy resin respectively.

TABLE II

CHEMICAL STRUCTURAL FORMULAS OF EPON 828 AND 871

DIGLYCIDYL ETHER OF BISPHENOL A
EPON 828

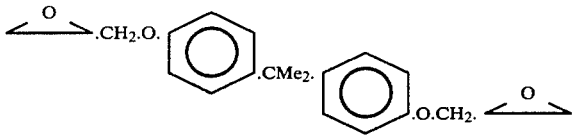

EPOXIDIZED DIMER (OLEIC ACID) ACID
EPON 871

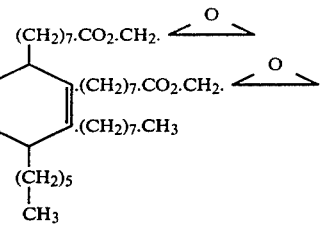

The composition of a typical epoxy blend, currently, used in the fabrication of composite motor cases is presented in Table III. This composition is employed as a single, uniform mixture in a bath from which filaments are coated during fabrication of rocket motor cases and laminated structures. The cured filament-epoxy-amine cured structure has the same value of mechanical properties throughout, i.e., from the innermost layer to the outermost layer, which is comprised of a low modulus matrix composition. A low modulus composition in the matrix is shown by Table V data to subject the filaments to higher stress values. However, first a review of Table IV below of the resin compositions will be more meaningful on what effect they have on hardening and modulus. The tough epoxy resin in this formulation is the bisphenol A-epichlorohydrin (EPON 828) whereas the flexibilized epoxy resin (EPON 871) is the epoxidized dimer of oleic acid. The butanediol diglycidyl ether functions as a reactive plasticizer, and TONOX 60/40 is an amine-crosslinking agent or curative.

TABLE III

TYPICAL RESIN COMPOSITION USED IN THE FABRICATION OF COMPOSITE FILAMENT-WOUND STRUCTURES

| COMPONENT NO. | INGREDIENT | COMPOSITION (PARTS BY WEIGHT |
|---|---|---|
| 1. | Bisphenol A-epichlorohydrin* | 25 |
| 2. | Epoxidized dimer acid** | 75 |
| 3. | Butanediol diglycidyl ether | 25 |

TABLE III-continued

TYPICAL RESIN COMPOSITION USED IN THE FABRICATION OF COMPOSITE FILAMENT-WOUND STRUCTURES

| COMPONENT NO. | INGREDIENT | COMPOSITION (PARTS BY WEIGHT |
|---|---|---|
| 4. | TONOX 60/40*** | 20 |

*EPON 828
**EPON 871
***Mixture composed of:
4,4'-diaminophenylmethane 65%
triamines 10%
polyamines 25%

TABLE IV

RESIN COMPOSITIONAL CHANGES TO EFFECT HARDENING AND MODULUS BY CHANGES IN RESIN BLEND

| COMPONENT NO. | INGREDIENT | COMPOSITION (PARTS BY WEIGHT) A | B | C | D |
|---|---|---|---|---|---|
| 1. | Bisphenol A-epichlorohydrin | 25 | 50 | 75 | 95 |
| 2. | Epoxidized dimer acid | 75 | 50 | 25 | 5 |
| 3. | Butanediol diglycidyl ether | 25 | 25 | 25 | 25 |
| 4. | TONOX 60/40 | 20 | 20 | 20 | 20 |

The typical compositional changes that can be effected in the resin blend resulting in changing the modulus and hardness are presented in Table IV above. The higher the bisphenol A-epichlorohydrin content, the higher the modulus and hardness will be. The change in epoxy blend in the filament impregnating bath can be accomplished by the progressive addition of the EPON 828, and, in this manner, effect the transition from the low modulus to the high modulus composition.

The improvements that would be effected in a composite motor case as a result of resorting to the use of the layered resin method of fabrication over the uniform resin method of fabrication are:

1. The outermost layer, because it contains a considerably higher content of the harder resin would be more resistant to any impact or abrasion damage.
2. The motor case would have greater resistance to water penetration on storage and aging.
3. The dimensional stability of the composite structure would be improved.
4. The overall flexural modulus would be greater.
5. The likelihood of crack propagation within the structure would be decreased.
6. The inner layers would have greater load carrying capacity because, when the motor case undergoes pressurization, the shear loads (which would frequently cause the fibers to break) would be distributed over a larger area, and cause less damage to the fibers.
7. And, more efficient utilization of the reinforcing fiber.

The influence of the properties of the resin matrix composition on the strain performances of the composite structure when used in combination with Hercules AS-4 graphite filaments is provided in Table V below. It addresses the difference in moduli and fiber stress which have been measured with different epoxy resins, and epoxy resins which have been hardened with Novalac as compared to the results with harder epoxy blends. This table teaches that toughening results in an increase in modulus values of the resin matrix while lessening the fiber stress values. This data supports the improvements effected in composite motor cases and laminated structures.

This observation about the fiber stress is not as significant when using Union Carbide's T-300 graphite in combination with Novalac-toughened resin, as illustrated in Table V hereinbelow.

TABLE V

INFLUENCE OF RESIN MATRIX PROPERTIES ON STRAIN PERFORMANCE OF GRAPHITE* FILAMENTS

| RESIN TYPE | MODULUS (KSI) | FIBER STRESS** (KSI) |
|---|---|---|
| Flexibilized epoxy blend | 100 | 514 |
| Toughened epoxy blend | | |
| Epoxy toughened | 500 | 495 |
| Novalac***-toughened | 640 | 380 |

*Hercules AS-4
**Derived from hoop stress measurements (Determined from 5.75-in. diameter pressure vessels) impregnated strand tensile strength = 585-KSI.
***Thermoplastic phenol-formaldehyde type resins obtained by the use of acid catalysts and excess phenol.

TABLE VI

INFLUENCE OF RESIN MATRIX PROPERTIES ON STRAIN PERFORMANCE OF GRAPHITE* FILAMENTS

| RESIN TYPE | MODULUS (KSI) | FIBER STRESS** (KSI) |
|---|---|---|
| Flexibilized epoxy blend | 80 | 500 |
| Toughened epoxy blend | | |
| Epoxy-toughened | 450 | 407 |
| Novalac***-toughened | 500 | 390 |

*Celion 3000
**Derived from hoop stress measurements (determined from 5.75-in. diameter pressure vessels) impregnated strand tensile strength = 460 KSI.
***Thermoplastic phenol-formaldehyde type resins obtained by the use of acid catalysts and excess phenol.

Figure 3:
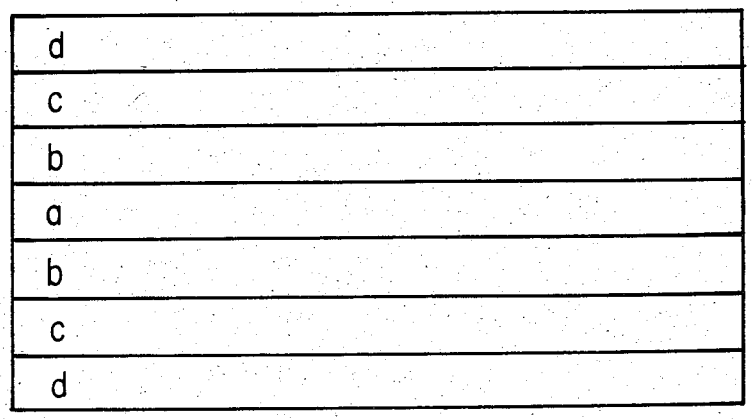
FIG. 3 of the drawing illustrates a schematic layup of a laminated structure composed of layers of filament-modified resin.

Additional references are made to the figures of the drawing where a schematic illustrating the layers of a typical laminated structure which is composed of several layers of a composite derived from different resin compositions is shown in FIG. 3. In this laminate cross-section layer "a" consists of a highly-flexible, low-modulus resin whereas layer "d" consists of a rigid high-modulus resin. Layers "b" and "c" are intermediate in modulus. These layers a–d are formed by a first second, third, and fourth predetermined winding process time periods wherein the toughened resin content in the filament impregnating bath is increased as layers a–d are formed.

Figure 5:
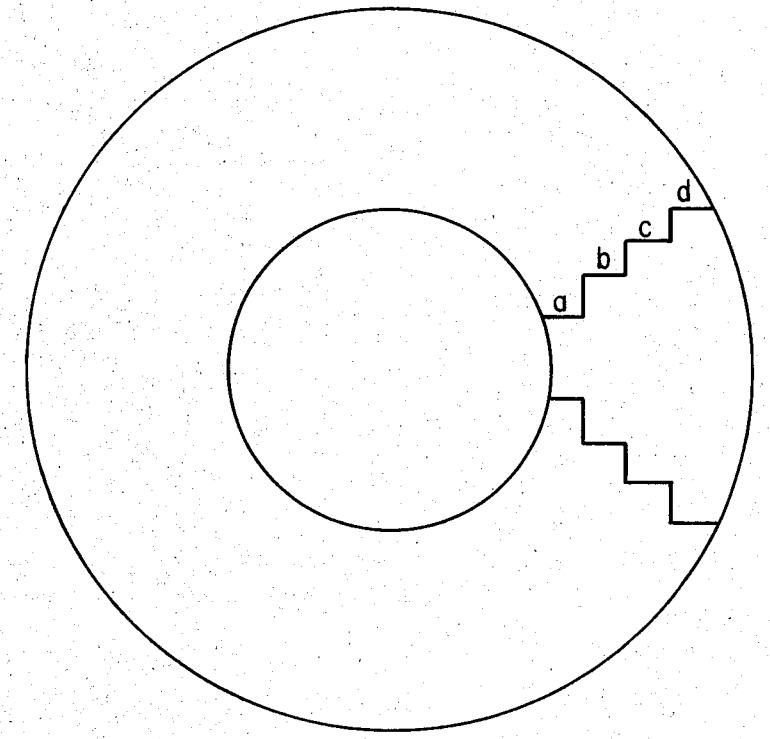
FIGS. 4 and 5 of the drawing are schematic illustrations which depict the difference between filament-wound structures produced by using uniform matrix composition a to a in FIG. 4 (prior art) as compared to variable matrix compositions a to b to c to d of FIG. 5 in accordance with the method of this invention.
Figure 4:
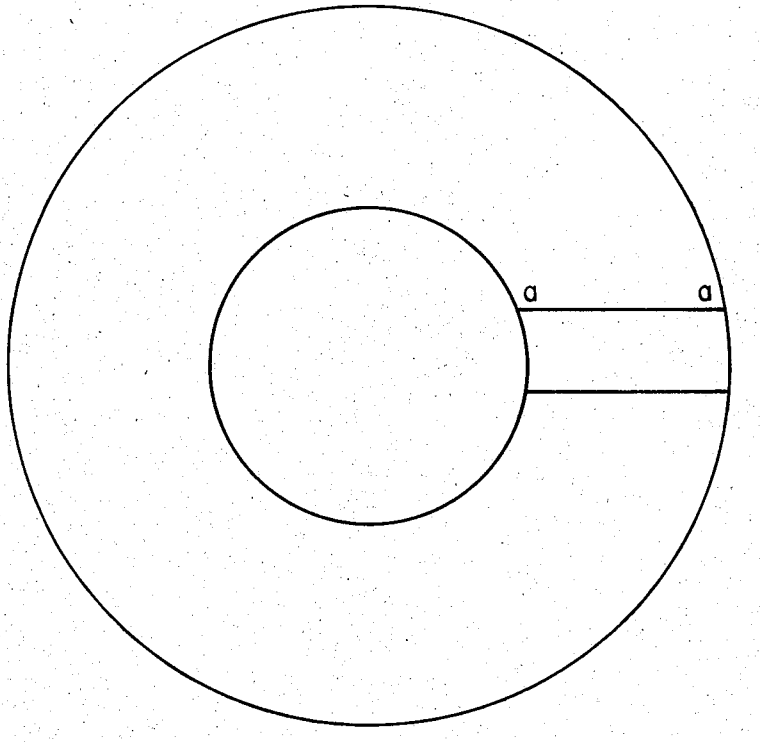
FIG. 4 (PRIOR ART)

Schematics illustrating the difference between a motor case of FIG. 4 produced by using a uniform resin composition "a"—"a", as compared to a variable-layered motor case of FIG. 5, are depicted in FIGS. 4 and 5. Regions "a" of FIG. 5 is a flexible, low-modulus matrix whereas region "d" of FIG. 5 is a rigid, high-modulus matrix, and regions "b" and "c" are intermediate-modulus matrixes.

Review of these figures in conjunction with the data of Tables V and VI is intended to provide a fuller appreciation of the structural benefits achieved with the method of this invention as compared with the lesser benefits achieved with the prior art method. Prior art structure of FIG. 5 of FIG. 4 is fabricated with a resin matrix of uniform composition whereas structure B has a variable composition to yield graduated modulus values which are benefitial for the reasons stated hereinabove.

I claim:

1. A method of manufacturing composite rocket motor cases wherein a fiber material having a constant strength and a curable resin having a variable formulation to yield a cured matrix from a low-modulus mechanical property value to a high-modulus mechanical property value are employed in a winding process to form successive layers of said fiber material which has been impregnated with said curable resin while passing through a filament impregnating bath containing said curable resin, said winding process when completed forming a composite rocket motor case having an innermost layer section of a highly-flexible, low-modulus mechanical property value matrix resin, an outermost layer section of rigid, high-modulus mechanical property value matrix resin, and a plurality of layer sections therebetween of intermediate modulus mechanical property value matrix resin, said method comprising:

i. providing a curable resin in a filament impregnating bath for coating a fiber material, said curable resin comprised of a first, second, third, and fourth component in a composition mixture wherein said first component is selected from diglycidyl ether of bisphenol A and a thermoplastic phenol-formaldehyde resin in predetermined parts by weight from about 25 to about 95, said second component which is epoxidized dimer of oleic acid in parts by weight from about 75 to about 5, said third component which is a reactive plasticizer of butanediol diglycidyl ether in parts by weight of about 25, and said fourth component which is an amine-crosslinking agent or curative in parts by weight about 20, said fourth component consisting of a mixture of 65 weight percent of 4,4'-diaminodiphenylmethane, 10 weight percent of triamines, and 25 weight percent of polyamines;

ii. adjusting said curable resin composition for said first, second, third, and fourth component to about 25, 75, 25, and 20 parts by weight respectively while passing a fiber material through said filament impregnating bath containing said curable resin and coating said fiber material during a plurality of predetermined winding process time period to establish said innermost layer section;

iii. readjusting said curable resin composition for said first, second, third, and fourth component to about 50, 50, 25, and 20 parts by weight respectively while continuing the passing of a fiber material through said filament impregnating bath containing said curable resin and coating said fiber material during a plurality of predetermined winding process time period to establish a first intermediate layer section;

iv. readjusting a second time said curable resin composition for said first, second, third, and fourth component to about 75, 25, 25, and 20 parts by weight after completing said first intermediate layer section respectively while continuing the passing of a fiber material through said filament impregnating bath containing said curable resin and coating said fiber material during a plurality of predetermined winding process time period to establish a second intermediate layer section;

v. readjusting a third time said curable resin composition for said first, second, third, and fourth component to about 95, 5, 25, and 20 parts by weight respectively after completing said second intermediate layer section while continuing the passing of a fiber material through said filament impregnating bath containing said curable resin and coating said fiber material during a plurality of predetermined winding process time period to establish an outermost layer section; and, vi. curing said curable resin to complete said method of manufacturing said composite rocket motor case having a variable matrix and a gradation of mechanical properties value for said innermost layer section which varies in modulus from about 80 to 100 KSI to said outermost layer section which varies in modulus from about 450 KSI to about 640 KSI.

2. The method of manufacturing composite rocket motor cases as defined in claim 1 wherein said first component of said composition is diglycidyl ether of bisphenol A, said innermost layer section has a modulus of from 80 to about 100 KSI, said outermost layer section has a modulus from 450 KSI to about 500 KSI, and wherein said fiber material coated is graphite.

3. The method of manufacturing composite rocket motor cases as defined in claim 1 wherein said first component is a thermoplastic phenol-formaldehyde resin, said innermost layer section has a modulus of about 100 KSI, said outermost layer section has a modulus of from 500 KSI to about 640 KSI, and wherein said fiber material coated is graphite.

* * * * *